No. 841,200.  
PATENTED JAN. 15, 1907.

J. K. WEDGWORTH.

ANIMAL TRAP.

APPLICATION FILED JULY 23, 1906.

Witnesses

Inventor

Jno. K. Wedgworth

Attorney

THE NORRIS PETERS CO., WASHINGTON, D. C.

UNITED STATES PATENT OFFICE.

JOHN KELLY WEDGWORTH, OF LOCKHART, MISSISSIPPI.

ANIMAL-TRAP.

No. 841,200.      Specification of Letters Patent.      Patented Jan. 15, 1907.

Application filed July 23, 1906. Serial No. 327,319.

*To all whom it may concern:*

Be it known that I, JOHN KELLY WEDGWORTH, a citizen of the United States, residing at Lockhart, in the county of Lauderdale and State of Mississippi, have invented new and useful Improvements in Animal-Traps, of which the following is a specification.

The present invention relates to that class of animal-traps comprising a pair of spring-operated pivoted jaws, a catch for holding them open, and a trigger for holding and releasing the catch.

The invention has for its object certain improvements with respect to the trigger, it being operated by a pull on the bait.

Figure 1:
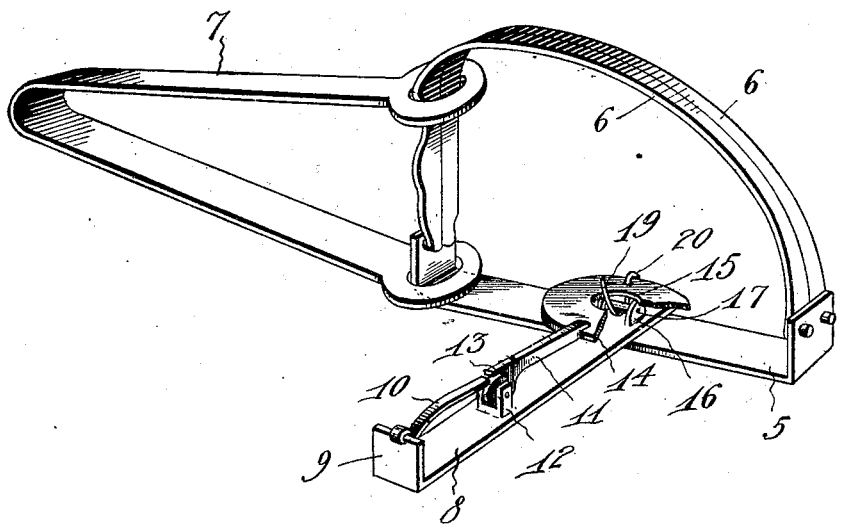
Figure 2:
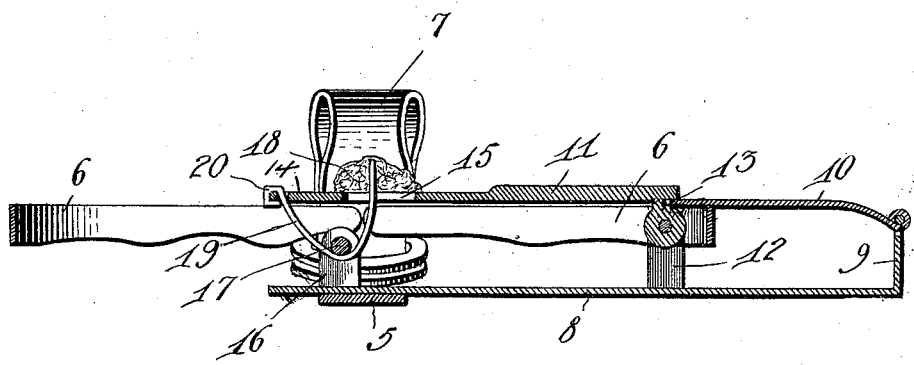

In the accompanying drawings, Figure 1 is a perspective view of the trap. Fig. 2 is a sectional view showing the trap set.

Referring specifically to the drawings, 5 denotes a base-plate, to which the jaws 6 are pivoted.

The spring for closing the jaws in the usual manner is indicated at 7.

To the base-plate is fastened a laterally-extending plate 8, having an upturned outer end 9, to which a catch 10 is pivoted. A trigger 11 is pivoted to a standard 12, rising from a plate 8. The rear end of the trigger has a notch 13 to receive the free end of the catch 10. At the opposite end the trigger carries a bait-plate 14. This plate has an opening 15 for a purpose to be hereinafter described. Under the bait-plate 14 are ears 16, which extend upwardly from the plate 8, and between said ears is journaled a roller or pulley 17. The bait 18 is placed on top of the plate 14 and is fastened to a wire or string 19, which extends through the opening 15 and around the roller and thence back to the bait-plate, being made fast thereto, as at 20.

To set the trap, one of the jaws 6 is placed under the catch 10 and the free end of the latter is placed in the notch 13 of the trigger 11. In this position the bait-plate is held slightly elevated, the bait-holder 19 being drawn taut. Upon pulling on the bait the bait-holder pulls the bait-plate down, whereupon the trigger is disengaged from the catch and the jaws closed by the spring 7. By reason of this arrangement the animal is usually caught by the head and is prevented from gnawing his foot, thus escaping.

I claim—

An animal-trap comprising spring-operated pivoted jaws, a catch therefor, a tilting trigger engageable by the catch and carrying a bait-plate provided with an opening, a roller under the bait-plate, and a bait-holding wire fastened to the bait-plate, and extending under the roller and up through the opening in the bait-plate.

In testimony whereof I have signed my name to this specification in the presence of two subscribing witnesses.

JOHN KELLY WEDGWORTH.

Witnesses:
    M. NOAKES,
    H. C. MCKINLEY.